P. C. MORGANTHALER.
PREPAYMENT DEVICE.
APPLICATION FILED JUNE 5, 1918.

1,315,786.

Patented Sept. 9, 1919.
2 SHEETS—SHEET 1.

Inventor:
Peter C. Morganthaler,
by
His Attorney.

P. C. MORGANTHALER.
PREPAYMENT DEVICE.
APPLICATION FILED JUNE 5, 1918.

1,315,786.

Patented Sept. 9, 1919.
2 SHEETS—SHEET 2.

Inventor:
Peter C. Morganthaler,
by Albert G. Davis
His Attorney.

UNITED STATES PATENT OFFICE.

PETER C. MORGANTHALER, OF FORT WAYNE, INDIANA, ASSIGNOR TO GENERAL ELECTRIC COMPANY, A CORPORATION OF NEW YORK.

PREPAYMENT DEVICE.

1,315,786.    Specification of Letters Patent.    Patented Sept. 9, 1919.

Application filed June 5, 1918. Serial No. 238,264.

*To all whom it may concern:*

Be it known that I, PETER C. MORGANTHALER, a citizen of the United States, residing at Fort Wayne, in the county of Allen, State of Indiana, have invented certain new and useful Improvements in Prepayment Devices, of which the following is a specification.

This invention relates to prepayment or control apparatus, and more particularly to apparatus of this character for metering devices, such, for example, as electric meters or gas meters. The object of the invention is to provide an improved prepayment apparatus and particularly one adapted for electric motor meters, and an apparatus which will be rugged in construction, accurate in operation and cheap to manufacture.

The novel features of the invention are indicated in the claims attached to and forming a part of this specification.

Figure 1:
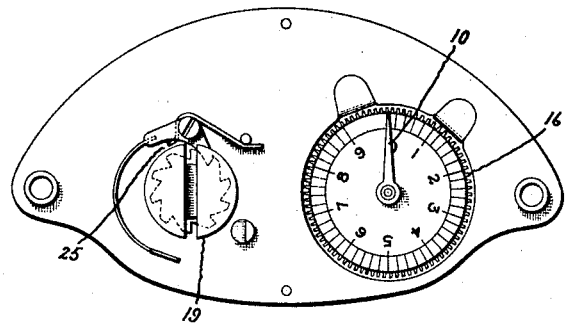
Figure 2:
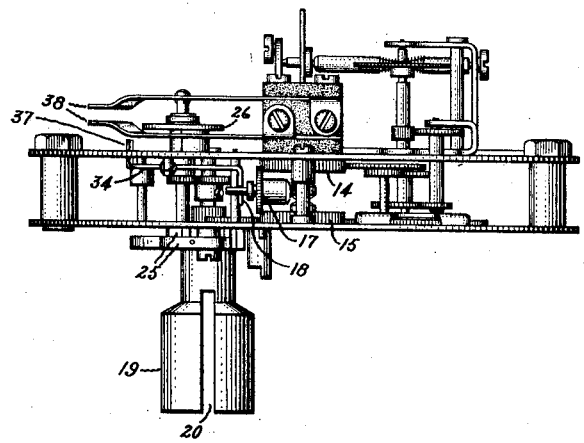
Figure 3:
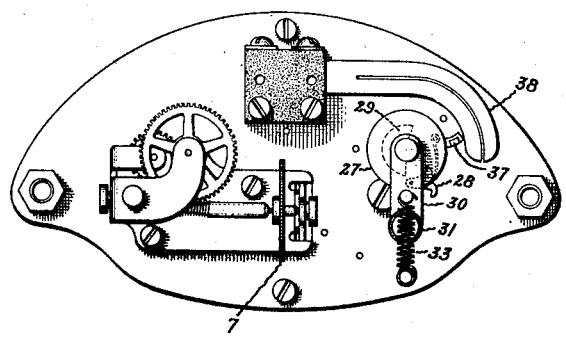
Figure 4:
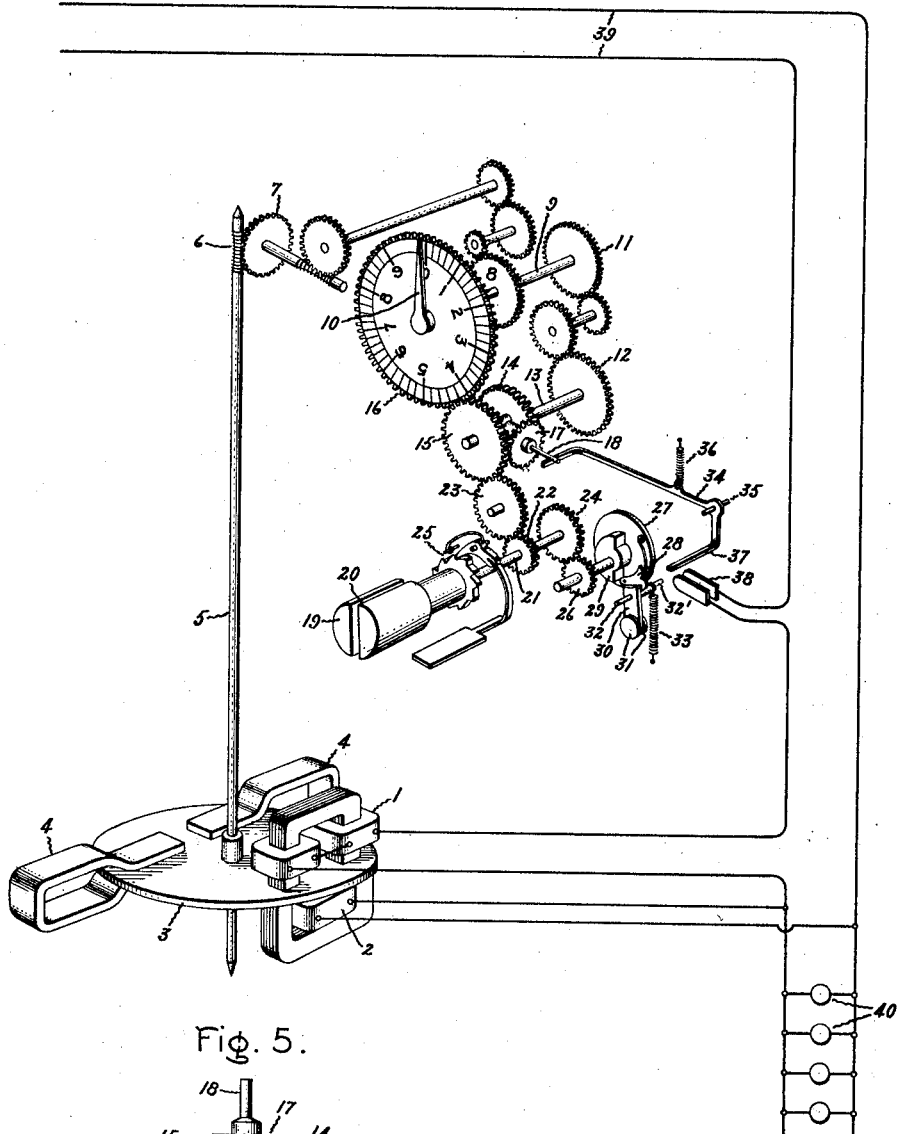
Figure 5:
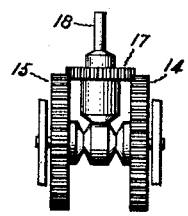

For a further understanding of this invention, reference may be made to the accompanying drawing, where Figure 1 is a front elevation of a prepayment mechanism embodying the present invention and particularly designed for a prepayment apparatus for electric energy; Fig. 2 is a top view; Fig. 3 is a back elevation of the prepayment mechanism of Fig. 1. Fig. 4 is an explanatory diagrammatic view in perspective of the mechanism shown in Figs. 1, 2 and 3, together with this mechanism when applied to the usual form of electric induction motor meter and an electric circuit and Fig. 5 shows a portion of the mechanism on an enlarged scale. In Fig. 4 the mechanism as shown in Figs. 1, 2 and 3 has been slightly changed and distorted to more clearly explain the construction and operation of my invention.

Referring now to Fig. 4, a usual form of electric induction motor meter is shown with the series coils 1 and the potential coil 2 surrounding magnetic cores which are in operative relation with the disk armature 3, causing the same to rotate in the well known manner. The usual damping magnets 4, in operative relation with the armature 3, are also shown. Armature 3 is rigidly attached to the shaft 5 at the upper end of which is a worm 6 operating the worm wheel 7. It will be understood that while I have described my invention as applied to an electric induction motor meter, any desired form of electric, gas, or other kind of meter may be employed with my invention.

The worm wheel 7, through any suitable combination of gears and shafts, drives the gear wheel 8 rigidly attached to shaft 9. Attached to this shaft is the pointer 10, which rotates in the usual manner dependent on the quantity of the commodity consumed for the purpose of indicating whether it is necessary to insert any more money in the prepayment apparatus to insure a continuance of the use of the desired commodity, in the well understood manner. Also attached to shaft 9 is a gear wheel 11, which by a suitable chain of gears guides the gear wheel 12 rigidly attached to shaft 13, to which shaft is also rigidly attached the gear wheel 14. Loosely mounted on the shaft 13 is the gear wheel 15, which drives the gear wheel 16, having upon it the usual dial with numerals to indicate the number of coin units. In operative relation with gear wheels 14 and 15, is the pinion 17, meshing with each of these wheels and mounted as shown so as to form a differential gearing and so that it will rotate on its axis in directions of rotation similar to that of either of the gear wheels 14 and 15. Mounted upon the pinion 17 is the pin 18 for a purpose which will be described later.

A manually rotatable member 19, with a coin slot 20, is shown, this rotatable member rotating the shaft 21, to which is rigidly attached gear wheel 22 meshing with gear wheel 23, which meshes with the gear wheel 15. Rigidly attached to shaft 21 is also the gear wheel 24. The shaft 21 can only be rotated in one direction owing to the action of the pawl and ratchet mechanism 25.

In order to simplify the drawings, only the elementary parts of the coin driven members are shown. A complete description of the coin driven device represented in the accompanying drawings will be found in United States patent to J. J. Wood, No. 849,448, patented April 9, 1907.

Meshing with the gear wheel 24 is gear wheel 26 rigidly attached to a shaft upon which is also attached the disk 27 having pivoted to it a pawl 28. 29 is a fixed cam against which the pawl rubs during a portion of the course of its rotation and in a manner which will be described later. A rotatable switch arm 30, mounted to rotate freely about an axis substantially the same as that of the disk 27, has fastened to it, but insulated from it two connecting contacts 31. Attached to this arm is a pin 32 which is in operative relation with the pawl 28, and also a pin 32'. Spring 33 is arranged so that when the arm 30 is in its closed position or the switch is in its circuit-closing position, the spring will tend to force the arm to its open or a substantially vertical position as shown.

The locking mechanism for the switch consists of a lever 34 rotatable about a pivot, 35 and biased to the position, as shown, by the spring 36. One end of the lever 34 is bent, as shown, so as to form a locking member 37, which is in operative relation with the pin 32' on the arm 30, to hold the switch in the closed position. The other end of the lever is in operative relation with the pin 18 on the pinion 17, as shown. The contacts 31 of the switch arm make contact with the contact members 38 and complete the circuit for the conductors 39 with the translating devices 40 which they supply.

The operation of my device, referring to Fig. 4, is as follows:

As shown by the figure, the switch is in its open position and the translating devices 40 cannot be used until a suitable coin has been inserted in the slot 20 and the manually rotatable member 19 has been rotated in the well understood manner. When a coin has been inserted in the slot and the member rotated, the disk 27 will rotate, carrying with it the pawl 28, the upper portion of which, as shown in the figure, will rub against the cam 29 and thus force the pawl into engagement with the pin 32. Further rotation of the disk and the pawl will carry the arm 30 around until the contacts 31 make contact with the stationary contacts 38. A quick circuit-closing contact will also be insured by the action of the spring 33. The switch will be locked in its circuit-closing position by pin 32' held against the locking end 37 of the lever 34. In addition to closing the switch, the manually rotatable member 19, by its rotation, will also rotate the gear wheel 15, causing the gear wheel 16, and with it the indicator, to rotate, and also causing the pinion 17 to rotate on its axis in a direction similar to the direction of rotation of the gear wheel 15 so that the pin 18 will be carried out of contact with and away from the end of the lever 34. One-half revolution of the rotatable member 19 will cause the indicator on the wheel 16 to move one division so that the numeral 1 on the dial is opposite the pointer 10 in the usual manner. The coin which has been inserted will then drop into a suitable box which is provided for devices of this character. If additional coins are inserted, the same general operation will take place, except that the pawl 28 will slip by the pin 32, owing to the shape of the surface of the cam 29, and the switch will thus remain in its circuit closing position and the gear wheel 16 will be rotated so that the indicator will assume positions relative to the pointer 10, dependent upon the number of coins used, and the pinion 17 will be rotated a greater distance from the end of the lever 34.

As soon as the switch is in its circuit-closing position and the circuit is closed, the translating devices 40 may be used, and when used and there is a consummation of energy, the armature 3 of the meter will rotate in the well known manner. This rotation by means of the worm and gear mechanism will cause the shaft 9 to rotate, making the pointer 10 rotate over the face of the indicator to indicate that the paid for energy is being consumed, and also causing the gear wheel 12, with the shaft 13, and the gear wheel 14 to rotate in a direction opposite to that in which the gear wheel 15 is rotated by means of the manually rotatable member 19. As the gear wheel 14 is rotated by the consumption of electric energy, it will cause the pinion 17 to rotate in a manner the reverse from that which has been described, and will cause the pin 18 to rotate toward the end of the lever 34. Just before all the energy paid for has been consumed, this pin will touch against the end of the lever 34, and, with the increased consumption of energy, will cause the lever 34 to rotate about the pivot 35 and thus move the locking end 37 away from engagement with the pin 32', holding the switch in the circuit-closing position. When the energy paid for has been entirely consumed, the locking member 37 will be moved completely out of engagement with the pins 32', and the spring 33, being under tension, will cause the switch arm to rapidly move downward and quickly break the circuit of the conductors 39 and assume the open-circuit position as shown.

It will be observed from the foregoing description that my improved prepayment mechanism can be very conveniently assembled on two parallel plates corresponding in size and configuration to the plates now generally employed for supporting the ratio gearing and register of an electric meter, and that my improved mechanism is simple to construct, rugged, with few parts, and is an improvement over the mechanism shown in my United States Patent No. 1,254,619, patented January 22, 1918.

My invention has been explained by illustrating and describing a certain specific embodiment thereof, but it will be readily understood by those skilled in the art that the invention may be embodied in many other forms than that shown and described, and I do not wish to be restricted to the particular form of construction disclosed but seek in the appended claims to cover all changes or modifications within the spirit and scope of my invention.

What I claim as new and desire to secure by Letters Patent of the United States, is:—

1. A prepayment apparatus comprising a rotatable member, means actuated by the delivery of a commodity to be sold for driving said member, a manually rotatable member, means including two gear wheels and a movable pinion engaging the same for operatively connecting said members, an electric circuit including a switch for controlling the delivery of the commodity, means actuated by said manually rotatable member for moving said switch to its circuit-closing position, means for locking said switch in its circuit-closing position, and means whereby said pinion operates to release said locking means when the first mentioned rotatable shaft completes a predetermined number of revolutions after the movement of the switch to its circuit-closing position.

2. A prepayment apparatus comprising a rotatable member, means actuated by the delivery of a commodity to be sold for driving said member, a manually rotatable member, means including two gear wheels and a movable pinion engaging the same for operatively connecting said members, an electric circuit including a switch for controlling the delivery of the commodity, means actuated by said manually rotatable member for moving said switch to its circuit-closing position, a lever normally locking said switch in its circuit-closing position, and means on said pinion engaging an end of said lever and moving it from its locking position when the first mentioned shaft completes a predetermined number of revolutions after the movement of the switch to its circuit-closing position.

3. A prepayment apparatus comprising a rotatable shaft, means actuated by the delivery of a commodity to be sold for driving said shaft, a gear wheel rigidly mounted on said shaft, a second gear wheel loosely mounted on said shaft, a pinion in operative relation with said gear wheels mounted to revolve about said shaft and to form a differential gear with said gear wheels, a manually rotatable member in operative relation with the second gear wheel, an electric circuit including a switch for controlling the delivery of the commodity, means actuated by said manually rotatable member for moving the switch to its circuit-closing position, means for locking the switch in its circuit-closing position, and means in operative relation with said pinion for opening said switch.

4. A prepayment apparatus comprising an electric circuit including a switch, a rotatable gear wheel, means actuated by the delivery of a commodity to be sold for driving said gear wheel, a second rotatable gear wheel, a manually rotatable member operatively connected to said second gear wheel and adapted to rotate it in a direction relatively opposite to the direction of rotation of the first gear wheel, a pinion in operative relation with each of said gear wheels mounted so that it will rotate on its axis in directions of rotation similar to that of either of the gear wheels, a pawl in operative relation with the manually rotatable member and adapted to close said switch, and a cam in operative relation with the pawl adapted to cause the pawl to close the switch on the first half revolution of the manually operated member, and means for opening the switch in operative relation with the pinion.

In witness whereof, I have set my hand this 1st day of June, 1918.

PETER C. MORGANTHALER.

Copies of this patent may be obtained for five cents each, by addressing the "Commissioner of Patents, Washington, D. C."